March 13, 1934.   L. L. McGEE   1,950,685
HYDRAULIC SNUBBER
Filed Sept. 12, 1932   2 Sheets-Sheet 1

INVENTOR
L. L. McGee
BY
ATTORNEY

March 13, 1934.  L. L. McGEE  1,950,685
HYDRAULIC SNUBBER
Filed Sept. 12, 1932   2 Sheets-Sheet 2
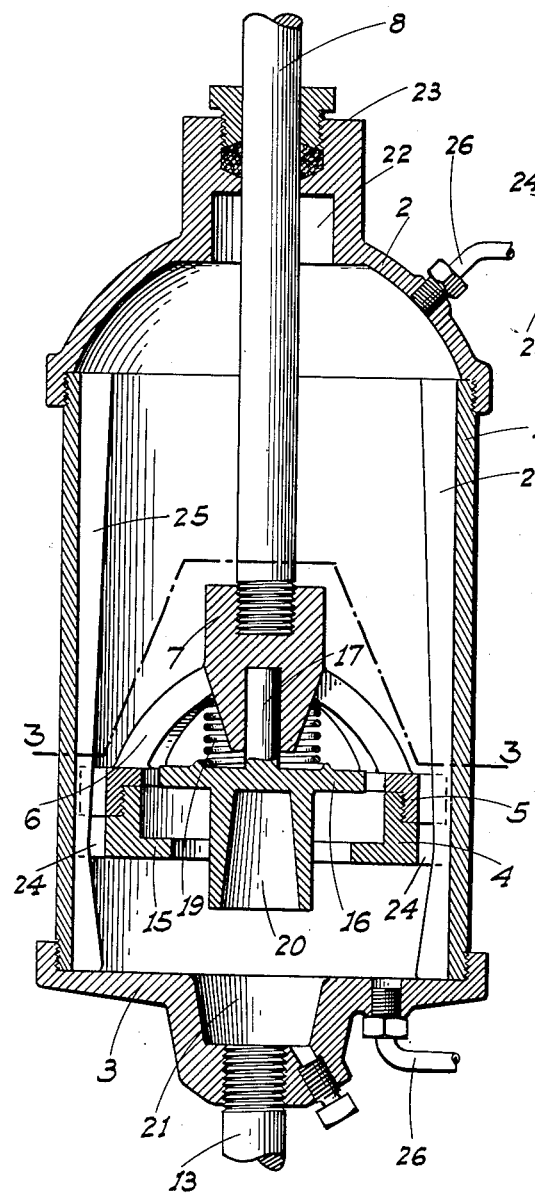
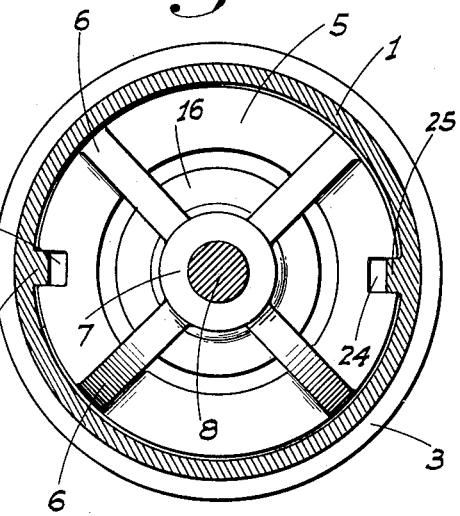
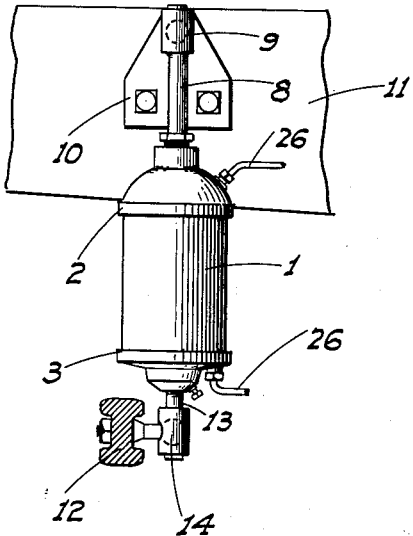
INVENTOR
L. L. McGee
BY
ATTORNEY Patented Mar. ?, 1934

1,950,685

UNITED STATES PATENT OFFICE 1,950,685

HYDRAULIC SNUBBER

Leonard L. McGee, Turlock, Calif.

Application September 12, 1932, Serial No. 632,653

4 Claims. (Cl. 188—88)

This invention relates to hydraulic shock absorbers or snubbers for motor vehicles, my principal object being to provide a device of this character so constructed that the speed of the rebound or retracting action and consequently the shock absorbing or checking effect will be automatically varied between the limits of movement of the device in such a manner that a very effective shock absorbing or checking action is had.

A further object is to provide an additional hand controlled means for governing the speed of retractive movement of the snubber piston.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 2 is a similar view showing the piston deflected, as when the axle and frame of the vehicle initially approach each other by an excessive deflection of the springs due to the vehicle encountering a bump, etc., on the road.

Fig. 3 is a sectional plan on the line 3—3 of Fig. 2.

Fig. 4 is a side elevation of the shock absorber showing the same as mounted in connection with the relatively movable axle and frame of a motor vehicle.

Figure 1:
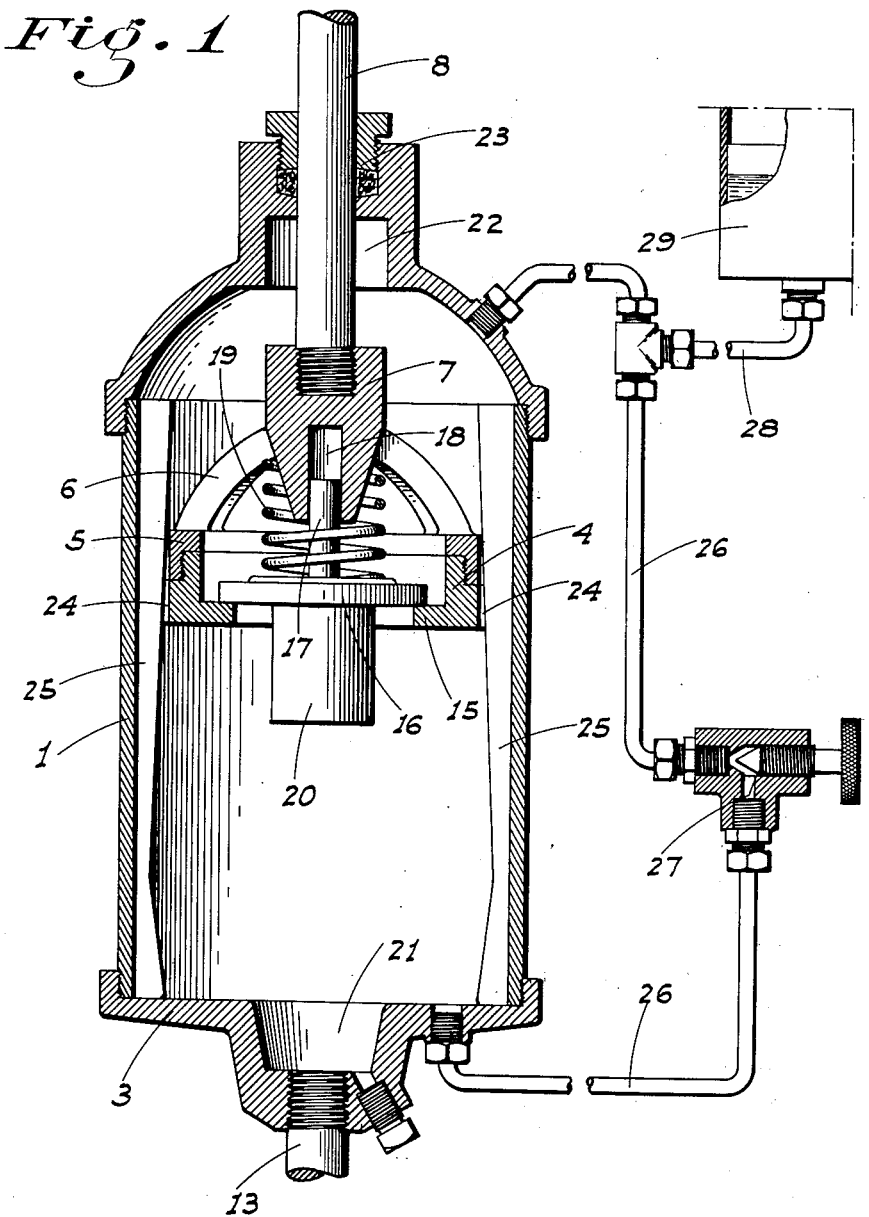
Fig. 1 is a sectional elevation of my improved hydraulic snubber with the piston in its normal position; the snubber being shown in connection with the liquid replenishing and hand controlled features.

Referring now more particularly to the characters of reference on the drawings, the numeral 1 denotes a cylindrical body provided at both ends with liquid-tight caps 2 and 3. A hollow or tubular piston 4 slidably engages the wall of the body, said piston being mounted on and depending from a ring 5 having spider arms 6 upstanding therefrom and which are connected to a hub 7 some distance above the piston. A rod 8 is secured to the hub and projects upwardly therefrom and through the cap 2. The upper end of this rod is provided with one member of a ball and socket joint 9 of conventional form by means of which connection is made with a bracket 10 supported on the side frame 11 of the car above the axle 12; said bracket having the other member of the ball and socket joint projecting therefrom. A short stem 13 is secured in and depends from the cap 3, said stem also having one member of a ball and socket joint 14 thereon; the other member of which is secured in any suitable manner to the axle 12.

The piston at its bottom is provided with an inwardly projecting shoulder 15 forming a seat for a valve disc 16 disposed above the same. Said piston, the ring 5 and the spider arms 6 therefore form a cage in which the valve is mounted and which limit its movement. The valve disc has an upstanding stem 17 slidable in a socket 18 in the hub 7 so as to hold the valve centralized in the piston, the hub limiting the upward or opening movement of the valve. A compression spring 19 is disposed about the hub and extends between the arms 6 and the valve disc to normally hold the latter closed or seated. The disc has a skirt 20 depending therefrom adapted to project into a cup 21 formed in the cap 3; the engagement of the cup with the skirt being only had when the piston is depressed to its limit of movement and with the valve open.

When the piston is raised excessively as with an abnormal rebound movement the hub 7 enters a cup 22 formed in the cap 2 below the rod engaging packing gland 23.

The piston 4 as well as the supporting disc 5 are provided on their opposite sides with vertical grooves 24 riding in ribs 25 extending down the sides of the body. The ribs decrease in radial width from the top to a point short of the bottom or to the position attained by the piston with a deflection of the same due to an ordinary shock, and then again increase in width to the bottom of the body.

A bypass conduit 26 is connected to the top and bottom caps of the body with a hand controlled needle valve 27 interposed therein. In addition another conduit 28 may be connected to the conduit 26 at any convenient point in its length, said conduit 28 leading from a liquid replenishing pressure supply receptacle 29. The valve 27 is preferably positioned on the instrument board of the car so that it may be operated at will by the driver from his seat. The receptacle 29 is also conveniently located on the vehicle so that it may be easily operated or refilled.

It is to be understood that while I have shown the body 1 as being attached to the axle and the piston rod to the frame, the device may be reversed or inverted so that the body will be attached to the frame and the piston rod to the axle. In either case of course the conduit 26 must be flexible adjacent the body so as to permit of the necessary movement of the body unavoidably had in operation without any tendency to strain or distort the conduit.

The body and conduits are completely filled with a liquid which is preferably oil and in operation the piston is normally disposed toward the top of the body when the snubber is mounted, as shown in the drawings. When the axle approaches the frame as when a bump etc. on the road is encountered the piston is lowered in the body, the valve 16 then automatically opening against the pressure of the oil below, as shown in Fig. 2, so as to permit of the unobstructed flow of such oil from below to above the piston. On the return or shock absorbing movement of the piston the valve immediately closes and the oil can only get back to the under side of the piston through the restricted area of the grooves 24 and the conduit 26. The volume of oil passing through the conduit is of course constant and depending on the setting of the valve 27 may be very accurately controlled, as will be evident.

When the piston is in its depressed position the spaces between the back of the grooves 24 and the adjacent faces of the ribs 25 are relatively large permitting the flow of an increasing volume of oil therethrough and consequently allowing a relatively fast speed of the piston. As the piston rises the open spaces in the grooves are decreased in size on account of the converging slopes of the ribs toward their upper ends, so that the volume of oil passing therethrough is correspondingly decreased. As a result the return speed of the piston is automatically and gradually lessened and checked from the beginning to the end of the retractive or rebound stroke giving a very efficient shock absorbing action.

If the piston reaches the extreme bottom position in the body the skirt 20 of the raised valve enters the cup 21 forcing the oil out and forming a checking cushion. Similarly after the piston reaches the topmost position in the body the hub 7 enters the cup 22 and the oil therein being forced out acts as a cushion. Any solid striking of metal against metal at either end of the piston stroke is therefore avoided.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hydraulic shock absorber including a body, a piston slidable in the body, a rod connected to the piston and projecting from one end of the body; said rod and the opposite end of the body being adapted for connection to relatively movable vehicle parts, a check valve in the piston opening in the direction of the rod, and ribs down the sides of the body decreasing in size from the plane of the normal position of the piston toward said opposite end of the body; the piston having grooves engaging said ribs and of a size sufficient to receive the ribs at their largest end.

2. In a hydraulic shock absorber having a body and a piston unit slidable therein, a hub on one end of the unit, and a rod connected to said hub and projecting through one end of the body for connection to a motor vehicle part, and a cup formed inside said one end of the body to receive the hub and provided a liquid cushion when the piston moves to an extreme position adjacent said end.

3. A structure as in claim 1, in which the ribs, adjacent said opposite end of the body, increase in size sharply to provide a corresponding restriction to the passage of oil past the piston as the latter approaches said end of the body.

4. A hydraulic shock absorber comprising a body, a piston slidable therein, a rod projecting from one end of the body, a check valve movable axially of the rod mounted in the piston to open in the direction of the rod, means limiting the opening movement of the valve, a skirt on the valve extending beyond the piston in the direction of the opposite end of the body, and a cup in said opposite end of the body to cooperate with the valve cup and providing a liquid cushion when the piston moves to an extreme position adjacent said end of the body.

LEONARD L. McGEE.